Figure 1:
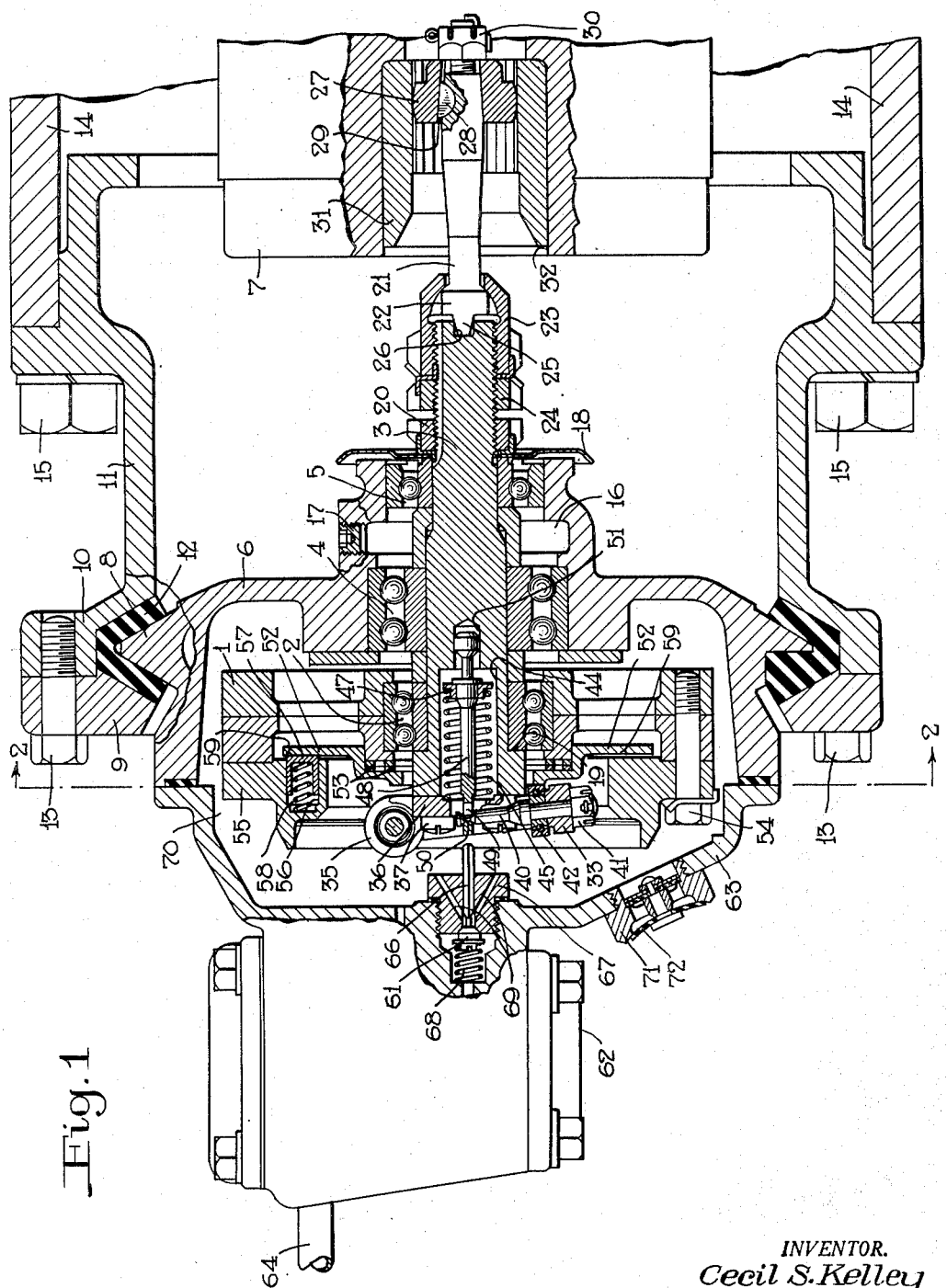

Nov. 21, 1950   C. S. KELLEY   2,531,054
ROTARY INERTIA DEVICE
Filed May 11, 1948   2 Sheets-Sheet 2

INVENTOR.
Cecil S. Kelley
BY
Frank E. Miller.
ATTORNEY

Patented Nov. 21, 1950

2,531,054

UNITED STATES PATENT OFFICE 2,531,054

ROTARY INERTIA DEVICE

Cecil S. Kelley, Forest Hills, Pa., assignor to The Westinghouse Air Brake Company, Wilmerding, Pa., a corporation of Pennsylvania Application May 11, 1948, Serial No. 26,332

10 Claims. (Cl. 264—11)

This invention relates to rotary inertia devices responsive to a certain predetermined acceleration or deceleration of a rotary element for effecting a desired control operation.

Although adapted for a wide variety of applications, the rotary inertia device comprising my present invention is designed particularly for application to railway locomotives or cars in a manner to register the abnormally rapid deceleration or acceleration of locomotive or car wheels occurring when slipping of the wheels is induced, either by excessive braking force or excessive propulsion power applied to the wheels, for the purpose of initiating a desired control operation such as the momentary release of the brakes associated with the braked wheels or the momentary reduction or removal of propulsion power applied to the driving wheels.

The term "slipping" as applied herein to a vehicle wheel refers to the rotative condition of the wheel in which the instantaneous rotational speed is either less than or greater than a speed corresponding to the speed of travel of the vehicle. The term "sliding" as applied herein to a vehicle wheel is not synonymous with the term "slipping," but refers to the locked condition of a wheel in which it is dragged along a rail without rotation.

The rotary inertia device constituting my present invention is of the type in which the relative rotary motion of a fly-wheel and the wheel axle induced by the deceleration or acceleration of the axle is utilized to actuate a suitable control device such as a control valve or switch. Rotary inertia devices of this type have previously been employed on railway car trucks for the purpose of automatically releasing and then reapplying the brakes on the car wheels in a manner to prevent locking of the wheels and the consequent sliding thereof. The safety of operation of railway cars and trains is thus increased and the development of flat spots on the wheels, which necessitates removal or repair of the wheels, is prevented. The copending application, Serial No. 485,130 of Joseph C. McCune, filed April 30, 1943, now Patent 2,447,709 assigned to the assignee of this application, discloses and claims one example of such type of rotary inertia device.

In rotary inertia devices of the type previously known, for example that of the above-mentioned patent of Joseph C. McCune, the maximum degree of relative rotation between the fly-wheel and its driving spindle is determined by so-called "limit stops" comprising cooperating members on the fly-wheel and on the driving spindle. It has been found, however, that in cases of very high degrees of braking, the inertia force acting on the fly-wheel in response to the abnormally high deceleration of a car wheel axle is such as to cause an instability of the fly-wheel due to the rebound of the fly-wheel from the limit stops. Such oscillatory rotational movement of the fly-wheel is undesirable in that it interferes with the positive operation of a control device operatively responsive to the relative rotary motion of the fly-wheel with respect to its driving spindle.

My present invention constitutes an improvement over previously known rotary inertia devices of the type referred to, in which the above-mentioned undesirable unstable operation of the fly-wheel with respect to the driving spindle, resulting from the impact of the fly-wheel on the limit stop, is averted and eliminated. Such desirable result is obtained, according to my invention, by providing a slipping clutch type of drive between the fly-wheel and its driving spindle so designed and constructed as to enable the fly-wheel to continue rotation relative to its driving spindle whenever the inertia forces on the fly-wheel, induced by excessive deceleration, are such as to cause operation of the control device forming part of the apparatus.

It is accordingly an object of my invention to provide a rotary inertia device including a novel arrangement for stabilizing the operation of the device in a manner to prevent undesired oscillatory action of the fly-wheel.

Figure 2:
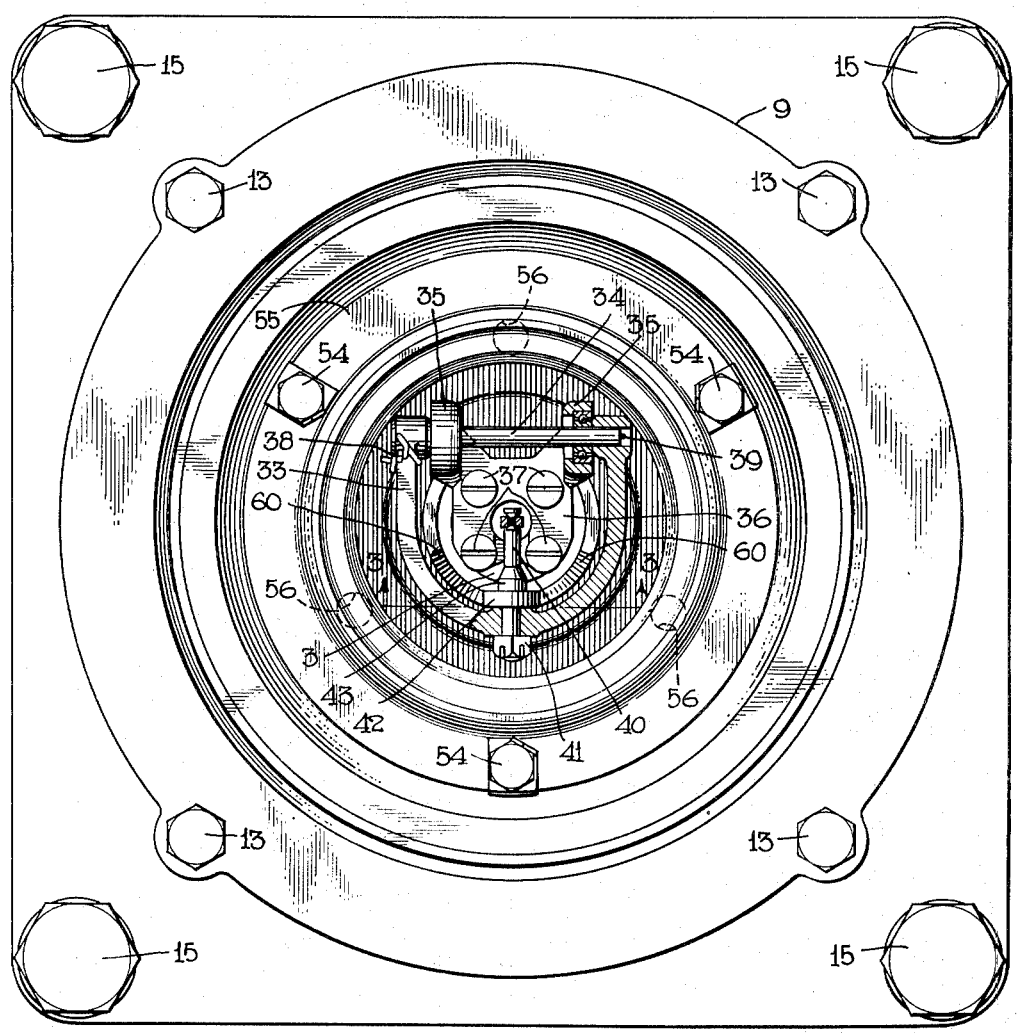
Figure 3:
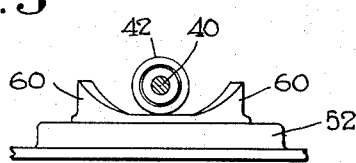

The above object, and other objects of my invention which will be made apparent hereinafter, are attained by means of an embodiment of my invention subsequently to be described and shown in the accompanying drawings, wherein Fig. 1 is a vertical sectional view, showing the construction of my novel rotary inertia device and the manner in which it may be mounted in association with a car wheel axle journal so as to be driven directly from the car wheel axle, Fig. 2 is a view, taken on the line 2—2 of Fig. 1, representing an end view looking toward the end of a car wheel axle and with the cover plate forming part of my novel rotary inertia device removed, and Fig. 3 is a fragmental view, taken on the line 3—3 of Fig. 2, showing the cooperative relation of two cams and a roller forming part of the mechanism by means of which the spindle drives the fly-wheel of my novel rotary inertia device.

Referring to the drawings, the embodiment shown therein comprises, in essence, a fly-wheel 1 journaled, as by a ball-bearing unit or race 2 secured in the hub thereof, on a driving spindle 3, the spindle being, in turn, journaled in two axially spaced ball-bearing units 4 and 5 that are secured in the hub of a non-rotative casing member 6.

The casing member 6 is cup-shaped and extends outwardly away from the end of the car wheel axle 7 in surrounding relation to the flywheel 1. Formed on the outer periphery of the casing member 6 is an annular rib 8 of substantially V-shaped cross-section whereby the casing member 6 is mounted in coaxial relation to the axle 7. The rib 8 on the casing member 6 is clamped between an outer clamping ring 9 and an annular flange 10, formed at the outer end of a so-called adapted ring 11, with a channel-shaped ring 12 of suitable cushioning material, such as rubber, intervening. As shown particularly in Fig. 2, four screws 13 are employed to secure the ring 9 to the flange 10 of the adapter ring 11.

The adapter ring 11 is provided at the inner end thereof with a radially extending flange that is secured to the open end of the journal casing 14, in place of the usual end cover, by a plurality of screws 15, shown in Fig. 2 as four in number.

The hub of the casing member 6 is provided with a suitable annular cavity 16, communicating with the two ball-bearing races 4 and 5 on opposite ends thereof, into which a supply of suitable lubricant may be introduced through a tapped bore closed by a screw plug 17. An end ring or plate 18 is suitably attached to the inner bearing ring of ball-bearing unit 5 to assist in preventing the entrance of oil or waste from the axle journal through bearing unit 5 which would contaminate the special lubricant in cavity 16 and result in damage to the bearing units 4 and 5.

The driving spindle 3 is provided at its outer end with a head of enlarged diameter which forms a shoulder 19 that engages the outer edge of the inner bearing ring of the ball-bearing unit 2. A nut 20, screwed over the inner threaded end of the spindle 3 cooperates with the shoulder 19 for maintaining the driving spindle 3 in position within the journal or hub of the casing member 6.

Attached to the outer threaded end of the spindle 3 is an extension member 21 that is interlocked with the end of the spindle 3 and secured thereto in a manner to provide a universal movement with respect to the spindle 3. This enables the spindle 3 to be rotationally driven by rotation of the axle even though out of line with respect to the axis of rotation of the axle 7. The extension member 21 is provided with a spherically-shaped head 22 that fits cooperatively within a correspondingly spherically-shaped surface formed on the inside of a retaining nut 23 that is screwed on the outer end of the spindle 3 and locked in position by a lock nut 24. A rib 25 on the end of the extension member 21 interlocks with a transversely extending groove 26 in the end of the spindle 3. To the opposite end of the extension member 21 is secured a longitudinally grooved ring member 27 that is locked to the member 21 as by a key 28 and keyway 29 and by a securing nut 30 screwed on the outer threaded end of the member 21. The grooved member 27 is inserted axially into a corresponding internally grooved sleeve member 31 that is pressed tightly into a central bore 32 at the outer end of the wheel axle 7. Spindle 3 is thus driven at all times in accordance with rotation of the axle 7.

The parts providing the driving connection between the spindle 3 and the fly-wheel 1 comprise a U-shaped control member or lever 33, hereafter referred to as the cam lever, having coaxially aligned hubs formed at the two extremities thereof, into which hubs the opposite ends of a pin or shaft 34 respectively extend. The pin 34 is journaled in two coaxially spaced lugs 35, disposed between the end hubs on the cam lever and formed integrally with a plate member 36 that is attached, as by a plurality of screws 37, shown in Fig. 2 as four in number, to the enlarged head at the outer end of spindle 3. The cam lever 33 is maintained in cooperative hinged relation on the pin 34 as by a retaining wire 38 inserted through a suitable hole 39, only one of which is shown in Fig. 2, extending diametrically through each of the end hubs of the cam lever 33 outside the ends of the pin 34.

Secured to the cam lever 33 at a point midway between the extremities thereof, is a pin or shaft 40, hereafter referred to as the cam shaft. The cam shaft 40 extends through a suitable bore in the cam lever and is attached to the cam lever as by a nut 41 screwed over the outer threaded end of the cam shaft. A suitable ball-bearing unit or roller 42 is retained on the cam shaft between a shoulder 43 on the shaft and a boss on the inner face of the U-shaped cam lever 33.

Disposed in a longitudinal bore or cavity 44 formed in the outer end of the spindle 3 is a coil spring 45, one end of which bears against the inner face of the plate 36 and the other end of which engages a suitable collar 47 secured on a rod 48 to urge the rod axially inward. The rod 48 has an elongated opening or eye 49 at the outer end thereof through which the end of the cam shaft 40 extends, the cam shaft having an annular groove 50 for receiving the end of the rod 48 in interlocking relation. This arrangement is such that the spring 45 acts through the rod 48 to yieldingly bias the hinged cam lever 33 in the direction of the end of the spindle 3. The rod 48 has an extension that cooperates slidably in a bore 51 of reduced diameter at the inner end of the bore 44 so as to support and guide the rod centrally of the larger bore 44.

The mechanism for effecting a driving connection between the spindle 3 and the fly-wheel 1 further comprises an annular member 52, hereinafter referred to as the cam plate, made of suitable metal such as steel. Cam plate 52 comprises a cylindrical hub and a flange at each end of the hub, one flange extending radially outward and the other extending radially inward. The inner surface of the hub of the cam plate 52 is suitably machined for rotative mounting on a correspondingly machined outer end surface of the hub of the fly-wheel 1.

One or more shim rings 53, of suitable bearing material, are interposed within the hub of the cam plate 52 between the inwardly extending flange and the outer end of the hub of the fly-wheel 1. The shim rings 53 serve a function, hereinafter explained, in addition to their bearing function. The shim rings 53 are each provided with suitable holes in circumferentially spaced relation, in which holes a suitable lubricant may be received. The outer diameter of the shim rings 53 conforms closely to the inner diameter of the hub of a cam plate 52 so that the shim rings are free to slide axially or rotationally within the hub portion of the cam plate without undue chattering.

Attached, as by a plurality of screws 54, to the outer face of the fly-wheel 1 in coaxial relation thereto is an annular member or ring 55 having a plurality of peripherally spaced bores 56, shown as three in number, each bore containing a slidable plunger or clutch shoe 57. Each clutch shoe 57 is yieldingly urged in an axial direction into frictional contact with the outwardly extending flange of the cam plate 52 by means of a coil spring 58 interposed between the base of the corresponding bore and the inner recessed surface of the clutch shoe 57.

As shown in Fig. 1, the outer face of the outwardly extending flange of the cam plate 52 is provided with a circular groove 59 that is disposed eccentrically with respect to the axis of rotation of the cam plate. The groove 59 is so located that lubricant contained in the groove serves to wipe the friction contact face of each clutch shoe 57, upon relative movement between the cam plate and the clutch shoes, for the purpose of minimizing wear at the point of contact between the shoes and the cam plate.

The springs 58 biasing the clutch shoes 57 into contact with the outwardly extending flange of the cam plate are so designed as to exert a desired force, which it has been found is preferably of the order of several ounces, to effect frictional engagement of the clutch shoes with the flange of the cam plate and, to some extent, frictional contact or association between the inwardly extending flange of the cam plate and the outer edge of the inertia wheel through the intervening shim rings 53. The shim rings 53 function, as previously indicated, in a dual capacity namely, not only to provide bearing contact between the inwardly extending flange of the cam plate and the hub of the fly-wheel but also to provide an adjustment of the force of the springs 58 on the clutch shoes 57. In other words, the number of the shim rings 53 may be varied upon assembly of the device, to provide a desired adjustment of the force of the springs 58 in a positive manner free from the possibility of maladjustment due to vibration or shock to which the device may be subject.

It will be apparent, therefore, that so long as the frictional force exerted is sufficient, the cam plate will rotate with the fly-wheel. However, if the frictional force holding the cam plate to the fly-wheel is exceeded, under conditions hereinafter explained, the fly-wheel and the cam plate 52 will rotate relative to each other, subject to the frictional retarding force exerted by the clutch shoes 57 and through the shim rings 53. Such relative movement between the fly-wheel 1 and the cam plate 57 will occur under circumstances more fully described hereinafter, as when the wheels on the axle 7 slip.

As shown in Fig. 3, the inwardly extending flange of the cam plate 52 is provided at the central opening thereof with two peripherally spaced axially-extending cams 60. The roller 42 on the cam shaft 40 is biased by the force of the spring 45 into the space between the two cams 60 and, by cooperation of roller 42 with one or the other of the cams, rotation of the spindle 3 causes a torque to be exerted on the cam plate and correspondingly on the fly-wheel 1 resulting in rotation of the cam plate and fly-wheel corresponding to the rotation of the spindle. It will be apparent that the cooperative action of the roller 42 and the cams 60 causes pivotal movement of the cam lever 33 away from the end of the spindle 3, in opposition to the yielding force of spring 45, to a degree which is substantially proportional to the acceleration or the deceleration of the spindle 3.

In order to limit the amount of relative rotary movement between the cam plate 52 and the cam lever 33 and to thereby correspondingly limit the outward pivotal movement of the cam lever 33, the cams 60 are adapted to engage one or the other of the journal lugs 35 supporting the pin 34 on which the cam lever 33 is hinged, depending upon the direction of relative rotary movement between the cam plate and the spindle.

The spring 45 is so designed and is of such strength that the outward pivotal movement of the cam lever 33 responsively to the deceleration or acceleration of the spindle 3 does not exceed a certain limited amount so long as the car wheels, on the axle 7 that drives the spindle 3, do not slip. If the car wheels slip, however, so that the rotary deceleration or acceleration of the spindle 3 exceeds a rate corresponding to retardation of the car of ten miles per hour per second or higher, then the cam lever 33 is moved pivotally outward from the end of the spindle 3 through a sufficient angle to cause engagement of the outer end of the rod 48 with the coaxially aligned end of the fluted stem of a pilot valve 61 and the consequent unseating thereof.

Pilot valve 61 forms part of a control valve device 62 that is shown only in outline form for the reason that my present invention does not require any specific type of control valve. As shown, the control valve 62 is embodied in a casing formed integrally with or attached to a cover plate 63 which is in turn secured to the outer face of casing member 6, as by a plurality of screws not shown.

The control valve 62 may serve to pneumatically control any other control mechanism for any desired purpose by controlling the pressure in a pipe 64 connected to the control valve.

The pilot valve 61 is of the poppet type and has a fluted stem 66 that extends slidably through a bore in a screw plug 67 that screws into a threaded bore on the inner face of the casing member 63. A coil spring 68 acts to bias the pilot valve 61 into seated position on an annular seat formed at the inner end of the screw plug 67. A plurality of vent ports 69 in plug 67 provide communication through which fluid under pressure may be vented at a rapid rate past the unseated pilot valve 61 to the chamber 70 within the cover member or plate 63.

The cover plate 63 is provided with a suitable exhaust port through which fluid under pressure in the chamber 70 is exhausted to atmosphere. As shown in the drawings, the exhaust port in the cover plate 63 may be provided with a screw type fitting 71 carrying a flexible disk type of one-way or check valve 72 so arranged as to permit the exhaust of fluid under pressure from the chamber 70 while at the same time being effective to prevent the entry of dust, stones or other undesirable particles into the chamber 70.

It will be understood that the unseating of the pilot valve 61 in response to the outward pivotal movement of cam lever 33 produces a corresponding operation of the control valve 62 pneumatically, and that the control valve 62 correspondingly causes fluid under pressure to be vented from the pipe 64 leading to any other control valve mechanism which it is desired to control.

In order to explain the operation of my novel rotary inertia device it will be assumed that the control valve 62 is so arranged as to control the pressure in a brake cylinder associated with the car wheels attached to the axle 7, in the manner fully described in the aforesaid Patent 2,447,709 of Joseph C. McCune.

So long as the degree of application of the brakes on the car wheels does not cause slipping thereof the rotary inertia device comprising my invention is not effective to exercise any control over the brake cylinder pressure. However, if the car wheels begin to slip due to bad rail conditions or an excessively high degree of a brake application with relation to the condition of the rails, then as previously described, cam lever 33 is actuated pivotally outward to effect unseating of the pilot valve 61, which in turn causes the control valve 62 to operate to vent fluid under pressure from the pipe 64. Such reduction of the pressure of the fluid in the pipe 64 will be effective to cause reduction of the pressure in the brake cylinder effecting application of the brakes on the slipping wheels. Due to the instantaneous and rapid reduction of the fluid pressure in the brake cylinder following the initiation of the slipping condition of the wheels, the brakes on the wheels are so promptly released that the wheels cease to decelerate at the abnormally rapid rate incidental to the slipping condition and immediately begin to accelerate back toward the speed corresponding to the speed of travel of the car.

It will be understood that when the cam plate 52 is rotated relative to the spindle 3 to the maximum extent determined by the engagement of one or the other of the cams 60 with the corresponding journal lug 35, the flywheel 1 does not correspondingly terminate rotary movement with respect to the spindle but continues rotation relative to the cam plate by reason of slippage at the point of contact between the clutch shoes 57 and the cam plate 52, the shoes 57 continuing to exert a braking effect on the fly-wheel 1 to absorb the excess energy therein. At the same time, the continued rotation of the fly-wheel 1 relative to the spindle 3 after rotational movement of the cam plate 52 with respect to the spindle 3 is terminated, serves to exert a continuing torque on the cam plate effective to maintain the cam lever 33 in its outward position holding the pilot valve 61 unseated.

It has been reliably determined by stroboscopic test that, under the conditions described, the flywheel 1 may continue to rotate through as much as one complete revolution with respect to the cam plate 52 after relative rotary motion between the cam plate and the spindle is terminated by engagement of one or the other of the cams 60 with the corresponding one of the journal lugs 35.

It will be understood, therefore, that when the spindle 3 accelerates correspondingly with the acceleration of the slipping car wheels back to the speed of travel of the car, the spindle will overtake the fly-wheel 1 substantially at the time that the car wheels are restored to car speed. Once the car wheels are restored to car speed the spindle 3 again decelerates in correspondence with the retardation of the car and the fly-wheel 1 again assumes a leading position rotarily with respect to the spindle 3 so as to cause an outward pivotal movement of the cam lever 33 in correspondence with the rate of deceleration of the spindle 3.

It will now be seen that substantially at the time that the slipping car wheels are restored to car speed the cam lever 33 is restored to its normal inner position by the action of the spring 45, thus restoring the pilot valve 61 to its seated position. Restoration of the pilot valve 61 to its seated position correspondingly restores the control valve 62 to its normal condition terminating the reduction of the pressure in the control pipe 64, and thereby resulting in the restoration of the supply of fluid under pressure to the brake cylinder and the consequent reapplication of the brakes to the heretofore slipping wheels.

In the event that the wheels again begin to slip following reapplication of the brakes the above operation is repeated so that at no time are the car wheels permitted to cease rotation and decelerate to a locked or sliding condition.

Having now described my invention, what I claim as new and desire to secure by Letters Patent, is:

1. A rotary inertia device of the type for registering the rotational acceleration or the rotational deceleration of a rotary member, comprising a rotary element adapted to be driven in correspondence with the rotation of the rotary member, a fly-wheel rotatably mounted with respect to said rotary element, a cam member rotatably mounted with respect to said rotary element and also with respect to said fly-wheel, a control member movably carried by said rotary element, means yieldingly biasing said control member into cooperative relation with said cam member whereby to provide a driving connection through which rotation of said cam member is effected in correspondence with the rotation of said rotary element, and clutch means including a clutch member carried by the fly-wheel and cooperating with said cam member to cause said fly-wheel to be driven in correspondence with said cam member and to be effective upon acceleration or deceleration of said rotary element to effect a corresponding movement of said control member and also permit rotation of the fly-wheel with respect to the cam member subject to the braking effect exerted through said clutch means.

2. A rotary inertia device of the type for registering the rotational acceleration or the rotational deceleration of a rotary member, comprising a rotary element adapted to be driven in correspondence with the rotation of said rotary member, a fly-wheel rotatably mounted with respect to the said rotary element, a cam member rotatably carried by said fly-wheel, a control member movably carried by said rotary element, means carried by the rotary element for yieldingly biasing said control member into cooperative relation with said cam member to provide a driving connection through which rotation of said cam member is effected in correspondence with rotation of said rotary element, clutch means including a clutch member carried by said fly-wheel and cooperating with said cam member to provide a driving connection between said cam member and said fly-wheel for causing said fly-wheel to be driven in correspondence with the rotation of the cam member and to be effective upon acceleration or deceleration of said rotary element to cause rotational movement of the cam member with respect to the rotary element and the consequent operative movement of the said control member, said clutch means also enabling the rotation of the fly-wheel with respect to the cam member to absorb excess energy therein occurring as a result of acceleration or deceleration of the rotary element.

3. A rotary inertia device of the type for registering both the rotational acceleration and the rotational deceleration of a rotary member, comprising a rotary element adapted to be driven in correspondence with the rotation of the rotary member, an annular member mounted in coaxial relation to said rotary element, a pair of axially extending cams on said annular element arranged in opposed peripherally spaced relation to each other, a lever member pivotally carried on said rotary element and having thereon a roller, spring means resiliently biasing the said lever member in a direction to cause said roller to engage in the space between said cams and in alternative cooperation therewith depending upon the direction of rotation of the rotary element to establish a driving connection through which a torque is exerted to rotate said annular member in correspondence with rotation of said rotary element, cooperating means partly on said annular member and partly on said rotary element for limiting to a certain angle on either side of a neutral position the relative rotational movement between the annular member and the rotary element, a fly-wheel rotatably mounted in coaxial relation to said rotary element, and clutch means including a clutch member carried by said fly-wheel and cooperating with said annular member so that said fly-wheel is driven in correspondence with the rotation of the annular member and is effective upon acceleration or deceleration of the rotary element to cause relative rotational movement of the annular member with respect to the rotary element up to the maximum degree permitted by the said cooperating means on said annular member and said rotary element and thereafter to permit frictionally resisted rotation of the fly-wheel with respect to said annular member, said lever member being pivotally moved in opposition to the force of said spring means responsively to the relative rotational movement between the annular member and said rotary element, and control means cooperating with said lever member and actuated thereby only upon the maximum pivotal movement thereof resulting from the maximum relative rotational movement between the annular member and said rotary element with respect to the neutral position.

4. A rotary inertia device of the type for registering both the rotational acceleration and the rotational deceleration of a rotary member, comprising a rotary element adapted to be driven in correspondence with the rotation of the rotary member, an annular member mounted in coaxial surrounding relation to said rotary element, a pair of axially extending cams on said annular element arranged in opposed peripherally spaced relation to each other, a lever member pivotally carried on said rotary element and having thereon a roller, spring means carried by said rotary element and cooperating with said lever member in a manner to resiliently bias the lever member in a direction to cause said roller to engage in the space between said cams and, by alternative cooperation with said cams depending upon the direction of rotation of the rotary element, to establish a driving connection through which a torque is exerted to rotate said annular member in correspondence with rotation of said rotary element, cooperating means partly on said annular member and partly on said rotary element for limiting to a certain angle on either side of a neutral position the relative rotational movement between the annular member and the rotary element, a fly-wheel rotatably mounted on said rotary element in coaxial relation thereto, a plurality of friction clutch elements movably carried by said fly-wheel, spring means carried by said fly-wheel for biasing said clutch elements into frictional contact with said annular member with such a force that said fly-wheel is driven in correspondence with rotation of the annular member and is effective upon acceleration or deceleration of the rotary element to cause relative rotational movement of the annular member with respect to the rotary element in proportion to the acceleration or deceleration of the rotary element, the force with which the spring means on the fly-wheel acts on said clutch elements being such as to permit frictionally resisted rotation of the fly-wheel with respect to the annular member for the purpose of absorbing excessive inertia in the fly-wheel when the acceleration or deceleration of the rotary element is such as to produce maximum relative rotative movement between the annular element and the rotary element with respect to the neutral position, said lever member being pivotally moved in opposition to the force of the spring means associated therewith by the cooperative action of the roller thereon with one or the other of said cams responsively to the relative rotational movement between the annular member and said rotary element, and control means cooperating with said lever member and actuated thereby only upon the maximum pivotal movement thereof resulting from the maximum rotational movement between the annular member and said rotary element with respect to the neutral position.

5. A rotary inertia device of the type for registering both the rotational acceleration and the rotational deceleration of a rotary member, comprising a rotary element adapted to be driven in correspondence with the rotation of the rotary member, a fly-wheel having a hub journaling said fly-wheel on said rotary element in coaxial relation thereto, an annular member including a central cylindrical portion whereby said annular member is rotatively mounted on the hub portion of said fly-wheel in coaxial surrounding relation to the rotary element, said annular member having two axially spaced flanges extending radially with respect to the axis of the rotation of the rotary element, a plurality of clutch elements movably carried by said fly-wheel, spring means carried by said fly-wheel for biasing said clutch elements into frictional contact with one of the flanges of said annular member and for simultaneously exerting a frictional force between the other of the flanges of the annular member and the hub of the fly-wheel, two axially extending cams carried on said annular member in peripherally spaced opposed relation, a lever member pivotally carried by said rotary element and having a roller thereon, spring means carried by said rotary element for resiliently biasing said lever member in a direction such that the roller thereon engages between said two cams, at which time said rotary element and said annular member occupy a neutral position relative to each other, said roller cooperatively engaging one or the other of said cams, depending upon the direction of rotation of the rotary element, to provide a driving connection through which torque is exerted to rotate said annular member and said fly-wheel in correspondence with rotation of said rotary element, said fly-wheel being effective upon acceleration or deceleration of said rotary element to cause rotational movement of the annular member with respect to the rotary element proportionally to the acceleration or deceleration of the rotary member, cooperating means partly on said annular member and partly on said rotary element for limiting to a certain amount the relative rotational movement thereof in either direction from the said neutral position thereof, said lever member being pivotally moved in opposition to the spring means acting thereon respectively to the relative rotational movement between said annular mmeber and said rotary element up to a maximum degree corresponding to the maximum degree of relative movement between the annular member and the rotary element in either direction from the neutral position, and control means cooperating with said lever member and actuated thereby only upon the maximum pivotal movement thereof resulting from the maximum relative rotational movement of the annular member with respect to the rotary element in either direction from the neutral position thereof.

6. A rotary inertia device of the type for registering both the rotational acceleration and the rotational deceleration of a rotary member, comprising a rotary element adapted to be driven in correspondence with the rotation of the rotary member, a fly-wheel having a hub journaling said fly-wheel on said rotary element in coaxial relation thereto, an annular member including a central cylindrical portion whereby said annular member is rotatively mounted on the hub portion of said fly-wheel in coaxial surrounding relation to the rotary element, said annular member having two axially spaced flanges extending radially with respect to the axis of the rotation of the rotary element, a plurality of clutch elements movably carried by said fly-wheel, spring means carried by said fly-wheel for biasing said clutch elements into frictional contact with one of the flanges of said annular member and for simultaneously exerting a frictional force between the other of the flanges of the annular member and the hub of the fly-wheel, a plurality of shim rings interposed between the other of the flanges of said annular member and the hub of said fly-wheel whereby to provide a frictional bearing surface therebetween and also adapted, by variation of the number thereof, for adjusting the force with which the said spring means biases said clutch elements, two axially-extending cams carried by the annular member in peripherally spaced opposed relation to each other, a lever member pivotally carried at the end of said rotary element and having a roller thereon rotatable on an axis substantially perpendicular to the axis of rotation of the rotary element, resilient means carried by the rotary element and cooperating with said lever member in a manner to bias it toward the end of the rotary element to cause the said roller to engage in the space between said two cams to provide a driving connection effective to cause rotation of said annular member and said fly-wheel in correspondence with the rotation of the rotary element, the roller on said lever member and said cams cooperating upon relative rotational movement between the annular member and the rotary element in either direction with respect to a neutral position responsively to the inertia of the fly-wheel to effect corresponding pivotal movement of said lever member in proportion to the acceleration and deceleration of the rotary element, cooperating means on said annular member and on said rotary element for limiting the rotational movement of the said annular member with respect to the rotary element to a certain angle in either direction with respect to the said neutral position, and control means cooperating with said lever member and actuated thereby only upon a maximum pivotal movement thereof resulting from the maximum relative rotational movement of the annular member relative to the rotary element in either direction from the said neutral position.

7. A rotary inertia device comprising a rotary driving element, a fly-wheel rotatably mounted with respect to said rotary driving element, an annular member rotatably mounted with respect to both of said rotary element and said fly-wheel, means establishing a driving connection between said driving element and said annular member including a control member operatively responsive to relative rotary movement between the annular member and the driving element, and means carried by said fly-wheel cooperating with said annular member to cause said fly-wheel and said annular member to rotate together and on occasion to permit relative rotary movement between the fly-wheel and the annular member.

8. A rotary inertia device comprising a rotary driving element, a fly-wheel rotatably mounted with respect to said driving element, an annular member rotatably mounted with respect to both said driving element and said fly-wheel, means establishing a driving connection between said driving element and said annular member including a control element operatively responsive to relative rotary movement between the annular member and the said driving element, and means including frictionally cooperating members for connecting said fly-wheel to said annular member to cause said fly-wheel to rotate with said annular member under certain conditions, and permit said fly-wheel to move rotatively with respect to said annular member subject to the frictional retarding force exerted through said frictionally cooperating members under other conditions.

9. A rotary inertia device comprising a rotary driving element, a fly-wheel rotatably mounted with respect to said driving element, an annular member rotatably mounted with respect to both said driving element and said fly-wheel, means establishing a driving connection between said driving element and said annular member characterized by limited rotary movement of said annular member with respect to said driving element and including a control member operatively responsive to the rotary movement of the annular member with respect to said driving element, a friction element carried by the fly-wheel, resilient means biasing said friction element into contact with said annular member to establish a driving connection between said fly-wheel and said annular member to cause said fly-wheel and annular member to rotate together within the range of the limited relative movement between the annular member and the driving element and thereafter permitting relative rotational movement between the fly-wheel and the annular member.

10. A rotary inertia device comprising a rotary driving element, a fly-wheel having a hub whereby said fly-wheel is rotatably mounted with respect to said driving element, an annular member comprising a central sleeve portion rotatably mounted on the hub of said fly-wheel and including an annular flange extending radially outwardly from said sleeve portion and an annular flange extending radially inwardly from said sleeve portion, means establishing a driving connection between said driving element and said annular member characterized by a limited degree of relative rotative movement between said annular member and said driving element and including a control member operatively responsive to the relative rotary movement between the annular member and the driving element, a friction element movably carried by the fly-wheel, resilient means biasing said friction element into frictional contact with the said outwardly extending flange of said annular means and biasing the inwardly extending flange of the annular member into frictional contact with the hub of said fly-wheel thereby to cause the fly-wheel and the annular member to rotate together within the limited range of relative rotary movement between the annular member and the rotary element, and thereafter to permit rotational movement of the fly-wheel with respect to the annular member subject to the frictional retarding force exerted by said friction element, and annular shim means interposed between said inwardly extending flange of the annular member and the hub of said fly-wheel adapted to vary the force with which said resilient means biases the friction element into contact with the outwardly extending flange of the annular member in accordance with the number of the annular shim means selected.

CECIL S. KELLEY.

REFERENCES CITED

The following references are of record in the file of this patent:

UNITED STATES PATENTS

| Number | Name | Date |
| --- | --- | --- |
| 758,010 | Kuhlewind | Apr. 19, 1904 |
| 2,366,044 | McCune | Dec. 26, 1944 |
| 2,427,239 | Taylor | Sept. 9, 1947 |
| 2,447,709 | McCune | Aug. 24, 1948 |

Certificate of Correction

Patent No. 2,531,054                                                     November 21, 1950

CECIL S. KELLEY

It is hereby certified that error appears in the printed specification of the above numbered patent requiring correction as follows:

Column 11, line 9, for the word "respectively" read *responsively*; line 11, for "mmeber" read *member*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*